United States Patent
Sun

(10) Patent No.: US 7,908,471 B2
(45) Date of Patent: Mar. 15, 2011

(54) HOST PERIPHERAL SYSTEM AND METHOD FOR LOADING AN EXTERNAL PROGRAM CODE TO A HOST FOR SETTING UP A TRANSMISSION MECHANISM WHEN BOOTING

(75) Inventor: Zhi-Ming Sun, Hsinchu (TW)

(73) Assignee: JMicron Technology Corp., Science-Based Industrial Park, Hsin-Chu (TW)

( * ) Notice: Subject to any disclaimer, the term of this patent is extended or adjusted under 35 U.S.C. 154(b) by 546 days.

(21) Appl. No.: 12/128,625

(22) Filed: May 29, 2008

(65) Prior Publication Data

US 2009/0254741 A1    Oct. 8, 2009

(30) Foreign Application Priority Data

Apr. 3, 2008  (TW) .............................. 97112182 A

(51) Int. Cl.
*G06F 15/177*  (2006.01)

(52) U.S. Cl. ........................ 713/2; 713/1; 710/8; 710/62

(58) Field of Classification Search .................. 713/1, 2; 710/8, 62
See application file for complete search history.

(56) References Cited

U.S. PATENT DOCUMENTS

| | | | |
|---|---|---|---|
| 7,293,166 B2 * | 11/2007 | Nguyen et al. .................... | 713/1 |
| 2007/0136568 A1 * | 6/2007 | Ding ................................ | 713/1 |
| 2008/0172556 A1 * | 7/2008 | Ishikawa et al. .................. | 713/2 |

* cited by examiner

*Primary Examiner* — Thuan N Du

(74) *Attorney, Agent, or Firm* — Winston Hsu; Scott Margo

(57) ABSTRACT

When booting a host, a host peripheral system sends a boot code to the host for controlling the booting operation of the host via a serial transmission line, and loads an external program code into the host. After setting up a transmission mechanism through executing the external program code, the host can forward a write command to the host peripheral system for writing the data provided by the external program code to the command identification sector of the non-volatile memory of the host peripheral system, and the host peripheral system is capable of identifying the data as a command and executes functional operations corresponding to the command. After finishing the functional operations, the host peripheral system forwards a finish signal to the host, and the host is able to send a read command for fetching the data signal generated in the functional operations.

24 Claims, 4 Drawing Sheets

HOST PERIPHERAL SYSTEM AND METHOD FOR LOADING AN EXTERNAL PROGRAM CODE TO A HOST FOR SETTING UP A TRANSMISSION MECHANISM WHEN BOOTING

BACKGROUND OF THE INVENTION

1. Field of the Invention

The present invention relates to a host peripheral system and method, and more particularly, to a host peripheral system and method for loading an external program code to a host for setting up a transmission mechanism when booting.

2. Description of the Prior Art

Please refer to FIG. 1, which is a functional block diagram schematically illustrating the system of a prior-art host 100. The host 100 comprises a central processing unit (CPU) 110, a read only memory (ROM) 120, a main memory 115, a hard disc drive 130, a main board 140, an optical disc drive 145, a sound effect card 150, a floppy disc drive 155, a keyboard 160, a display card 165, a mouse 170, and a host serial interface port 175. The CPU 110 functions to manage process control and perform system kernel operations of the host 100. The ROM 120 stores the initial program code of the basic input/output system (BIOS) 125 for setting the system configuration of the host 100 while booting. The main memory 115 stores the buffer data ready for processing. The CPU 110, the ROM 120, the main memory 115, the display card 165, the sound effect card 150 and the host serial interface port 175 are installed on the main board 140. The hard disc drive 130, the optical disc drive 145, the floppy disc drive 155, the keyboard 160 and the mouse 170 are coupled to the main board 140. The host serial interface port 175 may be utilized to couple an external host peripheral device for providing a data transmission interface between the host 100 and the external host peripheral device. The host serial interface port 175 can be a universal serial bus (USB) interface port, a serial advanced technology attachment (SATA) interface port, or a serial attached small computer system interface (Serial Attached SCSI, SAS) port.

The hard disc drive 130 stores an operating system 135. When the host 100 is powered, the host 100 executes the initial program code of the basic input/output system 125 for performing initialization processes such as the power-on self test (POST), the plug and play test, and various hardware configuration settings. After finishing the aforementioned initialization processes, the host 100 loads the operating system 135 so that functional operations can be performed through associating the hardware and software of the host 100 based on the configuration settings. The functional operations of the host 100 comprise memory accessing control, CPU processing control, file system managing control, and input/output control, etc.

Please refer to FIG. 2, which presents a flowchart depicting the booting operation of the host 100 shown in FIG. 1. The booting operation of the host 100 comprises the following steps:

Step S205: Power the host 100;
Step S210: Load the initial program code of the basic input/output system 125 stored in the ROM 120 into the main memory 115;
Step S215: Perform the process of power-on self test;
Step S220: Detect all the bootable devices attached to the host 100;
Step S225: Select a bootable device as the boot device and load the boot code stored in the boot sector of the selected bootable device into the host 100 for controlling the following booting processes;
Step S230: Load and execute the operating system 135 based on the boot code; and
Step S235: Perform functional operations of memory accessing control, CPU processing control, file system managing control, and input/output control, etc., based on the operating system 135.

In summary, the prior-art booting operation is carried out by loading the operating system based on the boot code of a bootable device immediately after performing the process of power-on self test for enabling the host to perform related functional operations.

SUMMARY OF THE INVENTION

In accordance with an embodiment of the present invention, a host peripheral system capable of loading an external program code into a host for setting up a transmission mechanism when booting is provided. The host peripheral system comprises a host serial transmission line, a device serial interface port, an integrated circuit device, and a non-volatile memory. The host serial transmission line is coupled to a host serial interface port of the host. The device serial interface port is coupled to the host serial interface port of the host via the host serial transmission line. The integrated circuit device is coupled to the device serial interface port. The non-volatile memory is coupled to the integrated circuit device. The non-volatile memory comprises a program memory block for storing the external program code, a command identification sector, and a boot sector for storing a boot code. The write data transferred from the host to the host peripheral system is identified as a command executable by the integrated circuit device when the host sends a write command for writing the write data provided by the external program code into the command identification sector. The integrated circuit device will execute functional operations corresponding to the command and after finishing the functional operations, forward a finish signal to the host.

The present invention further provides a method for loading an external program code into a host for setting up a transmission mechanism when booting. The method comprises coupling an integrated circuit device of a host peripheral system and the host by making use of a host serial transmission line, the host selecting the integrated circuit device as a boot device, the integrated circuit device sending a boot code stored in a non-volatile memory of the host peripheral system to the host, the host performing a booting operation based on the boot code, the host loading the external program code stored in the non-volatile memory of the host peripheral system based on the boot code, the host executing the external program code for setting up the transmission mechanism between the host and the host peripheral system, the host sending a write command to the integrated circuit device for writing related write data to a command identification sector of the non-volatile memory based on the transmission mechanism, the integrated circuit device identifying the related write data as a command executable by the integrated circuit device, the integrated circuit device executing functional operations corresponding to the command, and after finishing the functional operations, forwarding a finish signal to the host.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, preferred embodiments of the present invention will be described in detail with reference to the accompanying drawings. Here, it is to be noted that the present invention is not limited thereto. Furthermore, the step serial numbers concerning the method for loading an external program code to a host for setting up a transmission mechanism when booting are not meant thereto limit the operating sequence, and any rearrangement of the operating sequence for achieving same functionality is still within the spirit and scope of the invention.

Figure 1:
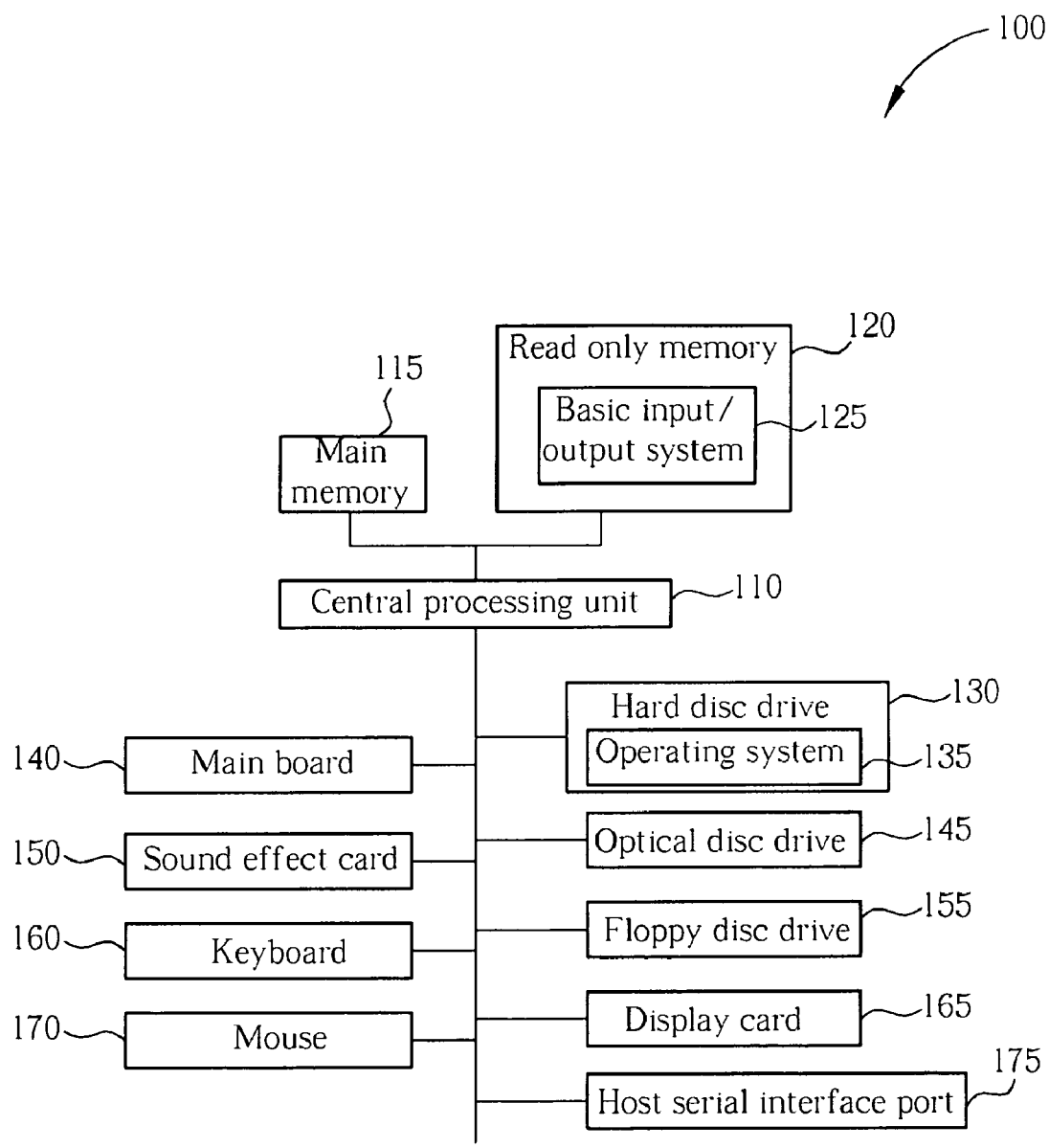
FIG. 1 is a functional block diagram schematically illustrating the system of a prior-art host.
Figure 2:
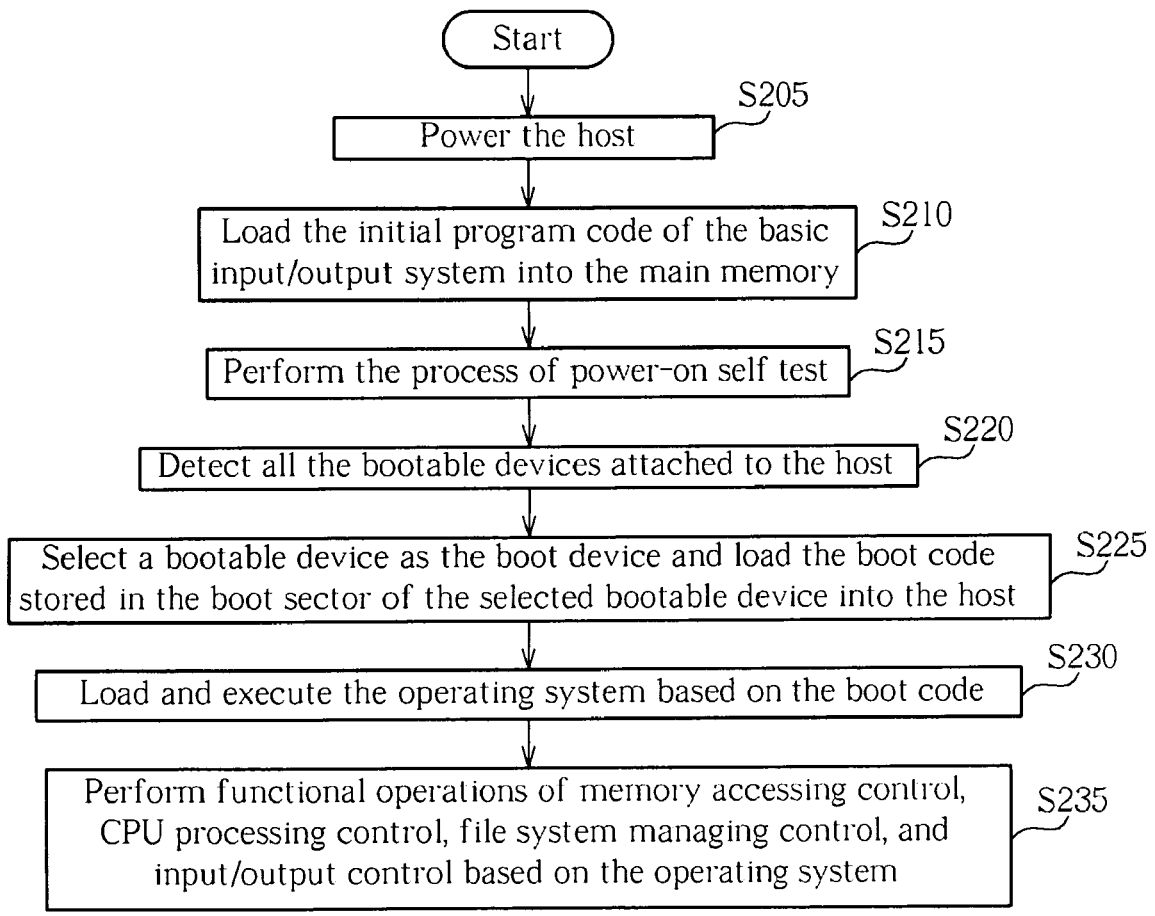
FIG. 2 presents a flowchart depicting the booting operation of the host shown in FIG. 1.
Figure 3:
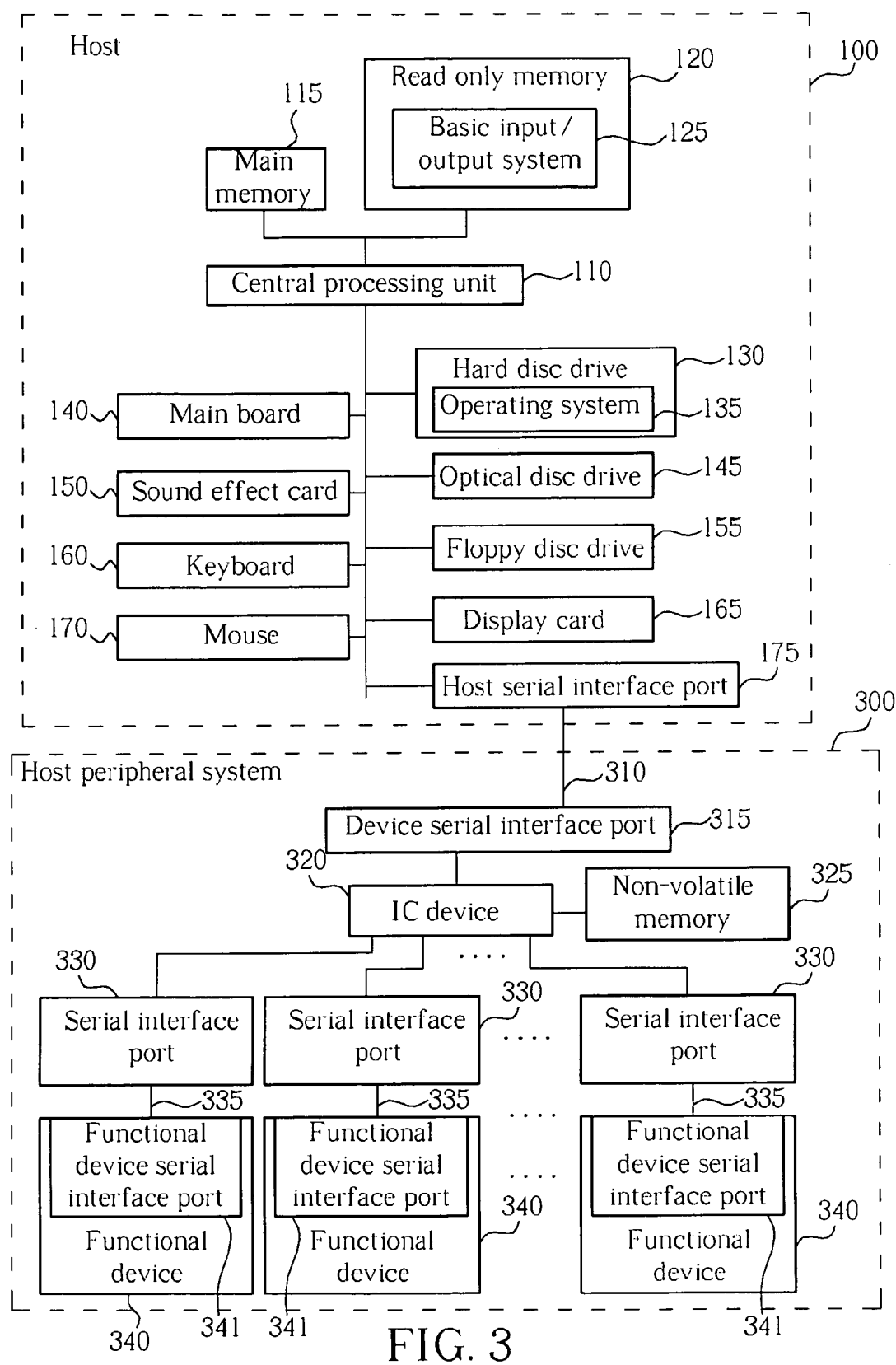
FIG. 3 is a functional block diagram schematically showing a host peripheral system capable of loading an external program code into the host for setting up a transmission mechanism when booting in accordance with a preferred embodiment of the present invention.

Please refer to FIG. 3, which is a functional block diagram schematically showing a host peripheral system 300 capable of loading an external program code into the host 100 for setting up a transmission mechanism when booting in accordance with a preferred embodiment of the present invention. The host peripheral system 300 comprises a host serial transmission line 310, a device serial interface port 315, an integrated circuit (IC) device 320, a non-volatile memory 325, a plurality of serial interface ports 330, a plurality of device serial transmission lines 335, and a plurality of functional devices 340. The host serial transmission line 310 is coupled between the device serial interface port 315 and the host serial interface port 175. That is, the host serial transmission line 310 provides the transmission medium between the device serial interface port 315 and the host serial interface port 175 for transferring data and commands. The host serial transmission line 310 can be an USB transmission line, a SATA transmission line, or a SAS transmission line. The device serial interface port 315 can be an USB interface port, a SATA interface port, or a SAS port.

The non-volatile memory 325 comprises a boot sector for storing a boot code, a program memory block for storing an external program code, and a command identification sector. The host peripheral system 300 makes use of the command identification sector for identifying the data sent from the host 100 as a command while performing a write command for writing the data provided by the external program code into the command identification sector. The non-volatile memory 325 can be a read only memory or a flash memory. The IC device 320 is coupled to both the device serial interface port 315 and the non-volatile memory 325 for transferring the boot code or the external program code stored in the non-volatile memory 325 to the host 100. Furthermore, the IC device 320 is capable of identifying the data sent from the host 100 as a command and executing the command while performing a write command for writing the data provided by the external program code into the command identification sector.

Accordingly, when the IC device 320 is identified as a bootable device after the host 100 is powered, the host 100 selects the IC device 320 as the boot device, and then the IC device 320 sends the boot code stored in the non-volatile memory 325 to the host 100. Subsequently, the host 100 performs the booting operation based on the boot code forwarded by the IC device 320 so that the IC device 320 is able to transfer the external program code stored in the non-volatile memory 325 to the host 100. Thereafter, the host 100 executes the external program code for setting up a transmission mechanism between the host 100 and the host peripheral system 300. Based on the transmission mechanism, the IC device 320 is capable of identifying the data sent from the host 100 as an executable command and executes the command for providing related functional operations when the host 100 forwards a write command to the IC device 320 for writing the data provided by the external program code into the command identification sector. The IC device 320 can be a signal processor or a System-on-Chip (SoC). The non-volatile memory 325 can be integrated into the IC device 320.

Each of the functional devices 340 comprises a corresponding functional device serial interface port 341. Each of the device serial transmission lines 335 is coupled between the functional device serial interface port 341 of corresponding functional device 340 and the corresponding serial interface port 330. That is, each of the plurality of device serial transmission lines 335 provides corresponding transmission medium between the IC device 320 and the corresponding functional device 340 for transferring data and commands. Each of the device serial transmission lines 335 can be an USB transmission line, a SATA transmission line, or a SAS transmission line. Each of the functional device serial interface ports 341 can be an USB interface port, a SATA interface port, or a SAS port. Also, each of the serial interface port 330 can be an USB interface port, a SATA interface port, or a SAS port.

The plurality of functional devices 340 may comprise at least one external hard disc drive, at least one external optical disc drive, at least one audio-video playback device, at least one external network device, or other customer-designed functional devices. In one embodiment, if the plurality of functional devices 340 comprises a plurality of external hard disc drives, then the host 100 is able to execute the external program code for driving the IC device 320 to set up redundant array of independent disks (RAID) systems based on the external hard disc drives. For instance, two of the external hard disc drives can be set up to become a RAID1 system, and other five of the external hard disc drives can be set up to become a RAID5 system. In another embodiment, if there is no external hard disc drive included in the plurality of functional devices 340, then the boot code stored in the non-volatile memory 325 may function as the boot code of a virtual hard disc drive. That is, the host peripheral system 300 is able to control the booting operation of the host 100 for loading the external program code into the host 100 by making use of the boot code of a virtual hard disc drive.

Figure 4:
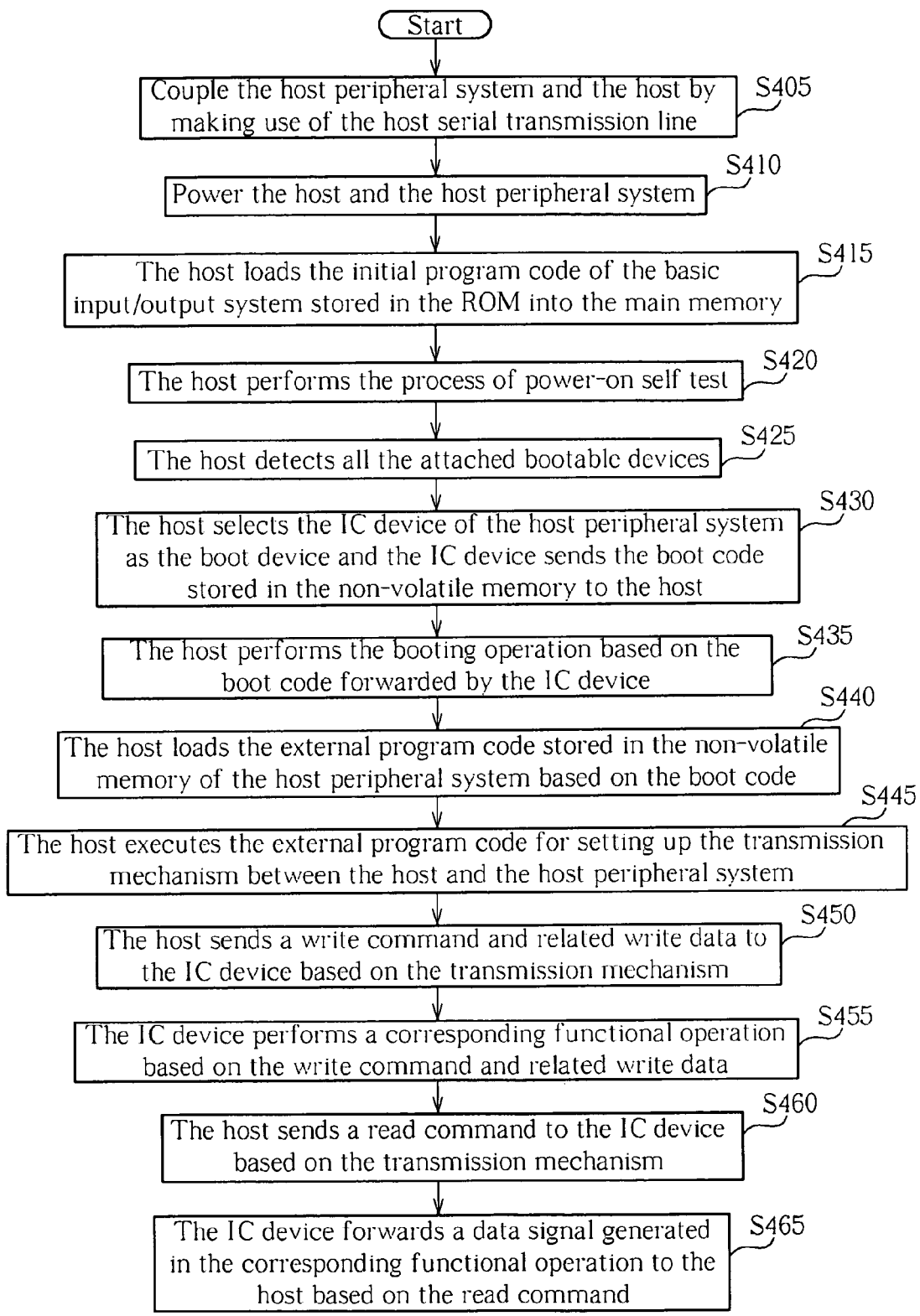
FIG. 4 is a flowchart depicting the method for loading an external program code from the host peripheral system in FIG. 3 to the host for setting up a transmission mechanism when booting in accordance with a preferred embodiment of the present invention.

Please refer to FIG. 4 in conjunction with FIG. 3. FIG. 4 is a flowchart depicting the method for loading an external program code from the host peripheral system 300 in FIG. 3 to the host 100 for setting up a transmission mechanism when booting in accordance with a preferred embodiment of the present invention. As shown in FIG. 4, the method comprises the following steps:

Step S405: Couple the host peripheral system 300 and the host 100 by making use of the host serial transmission line 310;

Step S410: Power the host 100 and the host peripheral system 300;

Step S415: The host 100 loads the initial program code of the basic input/output system 125 stored in the ROM 120 into the main memory 115;

Step S420: The host 100 performs the process of power-on self test;

Step S425: The host 100 detects all the attached bootable devices;

Step S430: The host 100 selects the IC device 320 of the host peripheral system 300 as the boot device and the IC device 320 sends the boot code stored in the non-volatile memory 325 to the host 100;

Step S435: The host 100 performs the booting operation based on the boot code forwarded by the IC device 320;

Step S440: The host 100 loads the external program code stored in the non-volatile memory 325 of the host peripheral system 300 based on the boot code;

Step S445: The host 100 executes the external program code for setting up the transmission mechanism between the host 100 and the host peripheral system 300;

Step S450: The host 100 sends a write command and related write data to the IC device 320 based on the transmission mechanism;

Step S455: The IC device 320 performs a corresponding functional operation based on the write command and related write data;

Step S460: The host 100 sends a read command to the IC device 320 based on the transmission mechanism; and Step S465: The IC device 320 forwards a data signal generated in the corresponding functional operation to the host 100 based on the read command.

In the aforementioned method, the process of step S450 may comprise that the host 100 sends the write command to the IC device 320 for writing the related write data provided by the external program code into the command identification sector of the non-volatile memory 325 so that the IC device 320 is capable of identifying the related write data as a command executable by the IC device 320. The process of step S455 may comprise that the IC device 320 forwards a finish signal to the host 100 when the IC device 320 completes the corresponding command operation based on the write command and related write data. The corresponding command operation can be the operation of a command corresponding to the related write data identified by the IC device 320 while performing the write command for writing the related write data into the command identification sector of the non-volatile memory 325. The process of step S460 may comprise that the host 100 sends the read command to the IC device 320 based on the transmission mechanism when the host 100 receives the finish signal from the IC device 320.

In summary, based on the host peripheral system and method of the present invention for loading an external program code to a host for setting up a transmission mechanism when booting, the boot code of a physical or virtual hard disc drive of the host peripheral system can be forwarded to the host via the serial transmission line for controlling the booting operation of the host while booting. Furthermore, the external program code can be loaded into the host based on the forwarded boot code so that the host is able to set up the transmission mechanism based on the external program code. After setting up the transmission mechanism, when the host sends a write command and related write data for writing the related write data provided by the external program code into the command identification sector of the non-volatile memory of the host peripheral system, the host peripheral system is able to identify the related write data sent by the host as an executable command and forwards a finish signal to the host while finishing the functional operations corresponding to the executable command. Then the host is capable of fetching the data signal generated in the functional operations of the host peripheral system by forwarding a read command to the host peripheral system while receiving the finish signal. That is, the host peripheral system is able to control the functional operations of the host by making use of the boot code and the external program code while booting, and the customer-designed functional settings or functional operations of the host peripheral system can be performed with the aide of functional operations of the host. It is noted that the commands and data are transmitted between the host and the host peripheral system via the same serial transmission line.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. A host peripheral system capable of loading an external program code into a host for setting up a transmission mechanism when booting, comprising:
    a host serial transmission line coupled to a host serial interface port of the host;
    a device serial interface port coupled to the host serial interface port of the host via the host serial transmission line;
    an integrated circuit device coupled to the device serial interface port; and
    a non-volatile memory coupled to the integrated circuit device, the non-volatile memory comprising a program memory block for storing the external program code, a command identification sector, and a boot sector for storing a boot code;
    wherein write data transferred from the host to the host peripheral system is identified as a command executable by the integrated circuit device when the host sends a write command for writing the write data provided by the external program code into the command identification sector.

2. The host peripheral system of claim 1, further comprising a plurality of serial interface ports coupled to the integrated circuit device.

3. The host peripheral system of claim 2, wherein each of the serial interface ports is a universal serial bus interface port, a serial advanced technology attachment interface port, or a serial attached small computer system interface port.

4. The host peripheral system of claim 2, further comprising:
    a plurality of device serial transmission lines, each of the device serial transmission lines being coupled to a corresponding serial interface port of the serial interface ports; and
    a plurality of functional devices, each of the functional devices comprising a functional device serial interface port coupled to a corresponding device serial transmission line of the device serial transmission lines.

5. The host peripheral system of claim 4, wherein each of the device serial transmission lines is a universal serial bus interface transmission line, a serial advanced technology attachment interface transmission line, or a serial attached small computer system interface transmission line.

6. The host peripheral system of claim 4, wherein the functional device serial interface port is a universal serial bus interface port, a serial advanced technology attachment interface port, or a serial attached small computer system interface port.

7. The host peripheral system of claim 1, wherein the host serial transmission line is a universal serial bus interface transmission line, a serial advanced technology attachment interface transmission line, or a serial attached small computer system interface transmission line.

8. The host peripheral system of claim 1, wherein the device serial interface port is a universal serial bus interface port, a serial advanced technology attachment interface port, or a serial attached small computer system interface port.

9. The host peripheral system of claim 1, wherein the host serial interface port of the host is a universal serial bus interface port, a serial advanced technology attachment interface port, or a serial attached small computer system interface port.

10. The host peripheral system of claim 1, wherein the integrated circuit device is a System-on-Chip (SoC).

11. The host peripheral system of claim 1, wherein the integrated circuit device is a signal processor.

12. The host peripheral system of claim 1, wherein the non-volatile memory is integrated into the integrated circuit device.

13. The host peripheral system of claim 1, wherein the non-volatile memory is a read only memory (ROM).

14. The host peripheral system of claim 1, wherein the non-volatile memory is a flash memory.

15. A method for loading an external program code into a host for setting up a transmission mechanism when booting, comprising:
    coupling an integrated circuit device of a host peripheral system and the host by making use of a host serial transmission line;
    the host selecting the integrated circuit device as a boot device;
    the integrated circuit device sending a boot code stored in a non-volatile memory of the host peripheral system to the host;
    the host performing a booting operation based on the boot code;
    the host loading the external program code stored in the non-volatile memory of the host peripheral system based on the boot code;
    the host executing the external program code for setting up the transmission mechanism between the host and the host peripheral system;
    the host sending a write command to the integrated circuit device for writing related write data to a command identification sector of the non-volatile memory based on the transmission mechanism; and
    the integrated circuit device identifying the related write data as a command executable by the integrated circuit device.

16. The method of claim 15, further comprising:
    powering the host and the host peripheral system before the host selecting the integrated circuit device as the boot device.

17. The method of claim 15, further comprising:
    the host detecting bootable devices attached to the host before the host selecting the integrated circuit device as the boot device.

18. The method of claim 15, further comprising:
    the integrated circuit device executing a functional operation corresponding to the command after the integrated circuit device identifying the related write data as the command executable by the integrated circuit device.

19. The method of claim 18, further comprising:
    the host sending a read command to the integrated circuit device after the integrated circuit device executing the functional operation corresponding to the command; and
    the integrated circuit device forwarding a data signal generated in the functional operation to the host after the host sending the read command to the integrated circuit device.

20. The method of claim 18, further comprising:
    the integrated circuit device forwarding a finish signal to the host after the integrated circuit device executing the functional operation corresponding to the command.

21. The method of claim 15, further comprising:
    the integrated circuit device performing functional operations corresponding to the command over a plurality of functional devices after the integrated circuit device identifying the related write data as the command executable by the integrated circuit device.

22. The method of claim 15, further comprising:
    the host loading an initial program code of a basic input/output system stored in a read only memory into a main memory and performing a process of power-on self test before the host selecting the integrated circuit device as the boot device.

23. The method of claim 15, wherein the integrated circuit device sending the boot code stored in the non-volatile memory of the host peripheral system to the host is the integrated circuit device sending the boot code stored in a boot sector of the non-volatile memory of the host peripheral system to the host.

24. The method of claim 15, wherein the host sending the write command to the integrated circuit device for writing the related write data to the command identification sector of the non-volatile memory based on the transmission mechanism is the host sending the write command to the integrated circuit device for writing the related write data provided by the external program code to the command identification sector of the non-volatile memory based on the transmission mechanism.

* * * * *